(12) United States Patent
Su et al.

(10) Patent No.: US 11,509,822 B2
(45) Date of Patent: Nov. 22, 2022

(54) IMAGING DEVICE AND IMAGING METHOD

(71) Applicant: GUANGZHOU LUXVISIONS INNOVATION TECHNOLOGY LIMITED, Guangzhou (CN)

(72) Inventors: Guan-Jie Su, Guangzhou (CN); Shih-Chieh Yen, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 0 days.

(21) Appl. No.: 17/313,350

(22) Filed: May 6, 2021

(65) Prior Publication Data
US 2021/0258480 A1 Aug. 19, 2021

(30) Foreign Application Priority Data
May 7, 2020 (CN) .......................... 202010376907.3

(51) Int. Cl.
*H04N 5/232* (2006.01)
*G01S 17/894* (2020.01)
*G01S 7/481* (2006.01)
*H04N 5/225* (2006.01)

(52) U.S. Cl.
CPC ....... *H04N 5/23229* (2013.01); *G01S 7/4817* (2013.01); *G01S 17/894* (2020.01); *H04N 5/2254* (2013.01); *H04N 5/2256* (2013.01)

(58) Field of Classification Search
None
See application file for complete search history.

(56) References Cited

U.S. PATENT DOCUMENTS

| | | | |
|---|---|---|---|
| 10,309,774 B2 * | 6/2019 | Ohtomo | G01S 17/89 |
| 10,914,823 B2 * | 2/2021 | Nash | G01S 7/4865 |
| 2018/0062345 A1 * | 3/2018 | Bills | G01S 7/4815 |
| 2018/0259828 A1 | 9/2018 | Spector | |
| 2019/0154809 A1 * | 5/2019 | Akkaya | G01S 17/89 |

FOREIGN PATENT DOCUMENTS

| | | |
|---|---|---|
| CN | 109343034 A | 2/2019 |
| CN | 109798879 A | 5/2019 |
| CN | 109819235 A | 5/2019 |
| CN | 110531583 A | 12/2019 |
| CN | 210142187 U | 3/2020 |
| TW | I504866 B | 10/2015 |
| TW | I513273 B | 12/2015 |

* cited by examiner

*Primary Examiner* — James M Hannett
(74) *Attorney, Agent, or Firm* — Birch, Stewart, Kolasch & Birch, LLP

(57) ABSTRACT

An imaging device includes a light emitter, an optical diffraction plate, a pair of wedge prisms, a rotation unit, a light receiver, and a processing unit. The light emitter emits a light beam. The optical diffraction plate is for converting the light beam into a plurality of diffracted light rays that forms a first light spot. The pair of wedge prisms is for adjusting an emission direction of the first light spot. The rotation unit is connected to the pair of wedge prisms and is for rotating the pair of wedge prisms relative to each other. The light receiver is for receiving a plurality of second light spots reflected from the plurality of first light spots. The processing unit is connected to the light receiver and is for generating a plurality of pieces of light spot information and processing the plurality of pieces of light spot information into image information.

7 Claims, 14 Drawing Sheets

IMAGING DEVICE AND IMAGING METHOD

CROSS-REFERENCE TO RELATED APPLICATION

This non-provisional application claims priority under 35 U.S.C. § 119(a) to Patent Application No. 202010376907.3 filed in China, P.R.C. on May 7, 2020, the entire contents of which are hereby incorporated by reference.

BACKGROUND

Technical Field

The invention relates to an imaging device and an imaging method, and in particular, to an imaging device and an imaging method using prisms and a time of flight (TOF) technology.

Related Art

In recent years, due to increasing demands of users for photography, with the rapid development of semiconductors, imaging configuration requires high-precision environmental identification and positioning. However, a traditional two-dimensional image detection method does not conform to requirements of some applications nowadays, and the applications require the use of three-dimensional (3D) measurements to obtain higher precision and accuracy. Moreover, in various three-dimensional measurement technologies, non-contact optical measurement is the most commonly used technology.

Generally, methods for collecting three-dimensional information of objects include a contact measurement and a non-contact measurement. The two methods are distinguished by whether to be in contact with the measured object. In addition, since the contact measurement requires a probe to move on a surface of the object, not only a size of a detection device is limited, but also the probe is easy to damage the object to be measured.

Currently, in various three-dimensional measurement technologies, the non-contact measurement using optical principles is the most commonly used technology. The optical 3D measurement technology may be divided into a passive measurement and an active measurement. For example, the former (that is, the passive measurement) is binocular stereo measurement (stereo matching), and the latter (that is, the active measurement) is a time of flight (TOF).

The TOF is a three-dimensional active optical ranging technology. The measurement principle for the technology is that an instrument actively emits light to a to-be-measured object, and a phase difference or a time difference between the emitted light and the reflected light is calculated upon receipt of light reflected by the to-be-measured object, and a total movement time of a light source is estimated according to the phase difference or the time difference, thereby obtaining a distance between the instrument and the to-be-measured object or depth information.

SUMMARY

However, an imaging device using a TOF technology has poor photographing resolution and/or a small photographing range.

In view of this, the present invention provides an imaging device and an imaging method, so as to solve the problem of poor photographing resolution and the small photographing range.

In some embodiments, an imaging device includes a light emitter, an optical diffraction plate, a pair of wedge prisms, a rotation unit, a light receiver, and a processing unit. The light emitter is for emitting a light beam. The optical diffraction plate is on a light channel of the light emitter. The optical diffraction plate is for converting the light beam into a plurality of diffracted light rays, wherein the plurality of diffracted light rays forms a first light spot. The pair of wedge prisms is on the light channel and is for adjusting an emission direction of the first light spot corresponding to an angle. The rotation unit is connected to the pair of wedge prisms. The rotation unit is for rotating the pair of wedge prisms relative to each other, so that the plurality of first light spots is sequentially emitted in the adjusted emission directions corresponding to the plurality of angles respectively. The light receiver is for sequentially receiving a plurality of second light spots reflected from the plurality of first light spots corresponding to the plurality of angles. The processing unit is connected to the light receiver. The processing unit is for generating a plurality of pieces of light spot information according to the plurality of second light spots and processing the plurality of pieces of light spot information into image information.

In some embodiments, an imaging method includes emitting a light beam and converting the light beam into a plurality of diffracted light rays, wherein the plurality of diffracted light rays forms a first light spot; adjusting an emission direction of the first light spot corresponding to an angle, so that the plurality of first light spots is sequentially emitted in the adjusted emission directions corresponding to a plurality of angles respectively; sequentially receiving a plurality of second light spots reflected from the plurality of first light spots corresponding to the plurality of angles; generating a plurality of pieces of light spot information according to the plurality of second light spots; and processing the plurality of pieces of light spot information into image information.

Based on the above, according to the imaging device and the imaging method of some embodiments provided in the present invention, the projection direction of the light spots can be changed by rotating a pair of wedge prisms, so as to achieve a wider irradiation range or a finer light spot distribution, thereby improving a photographing range (that is, improving a limitation on an angle of view) or photographing resolution. Therefore, the present invention can provide an imaging device with a smaller volume and reduce manufacturing costs of the imaging device.

DETAILED DESCRIPTION

Figure 1:
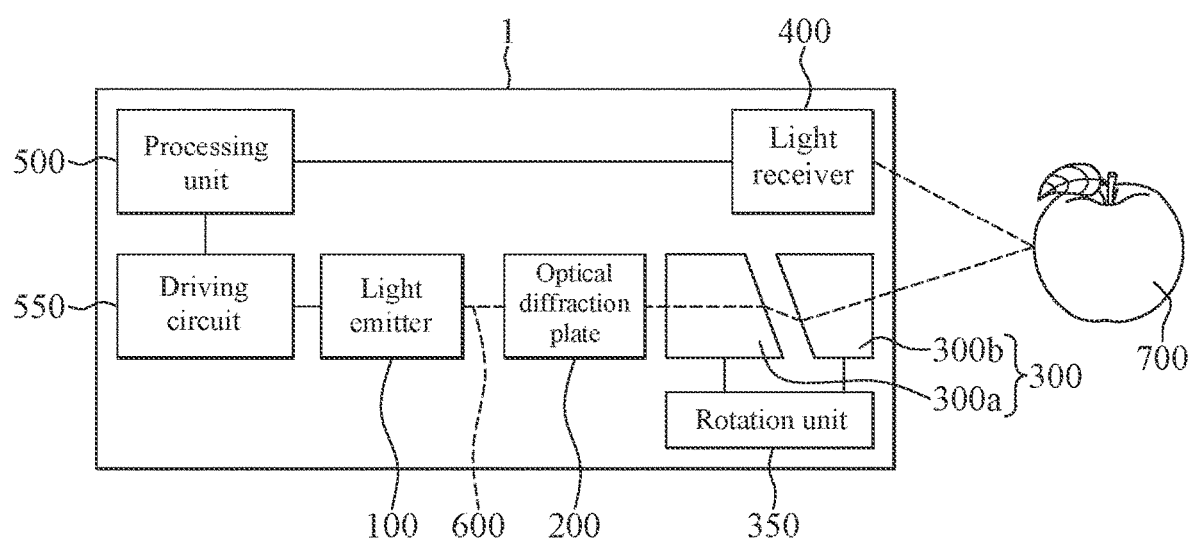
FIG. 1 is a schematic diagram of an imaging device according to some embodiments of the present invention.

Referring to FIG. 1, in some embodiments, an imaging device 1 includes a light emitter 100, an optical diffraction plate 200, a pair of wedge prisms 300, a rotation unit 350, a light receiver 400, and a processing unit 500. The rotation unit 350 is connected to the pair of wedge prisms 300. The processing unit 500 is connected to the light receiver 400. The optical diffraction plate 200 and the pair of wedge prisms 300 are on a light channel 600 of the light emitter 100. In other words, the optical diffraction plate 200 is on an optical output axis of the light emitter 100.

Figure 9:
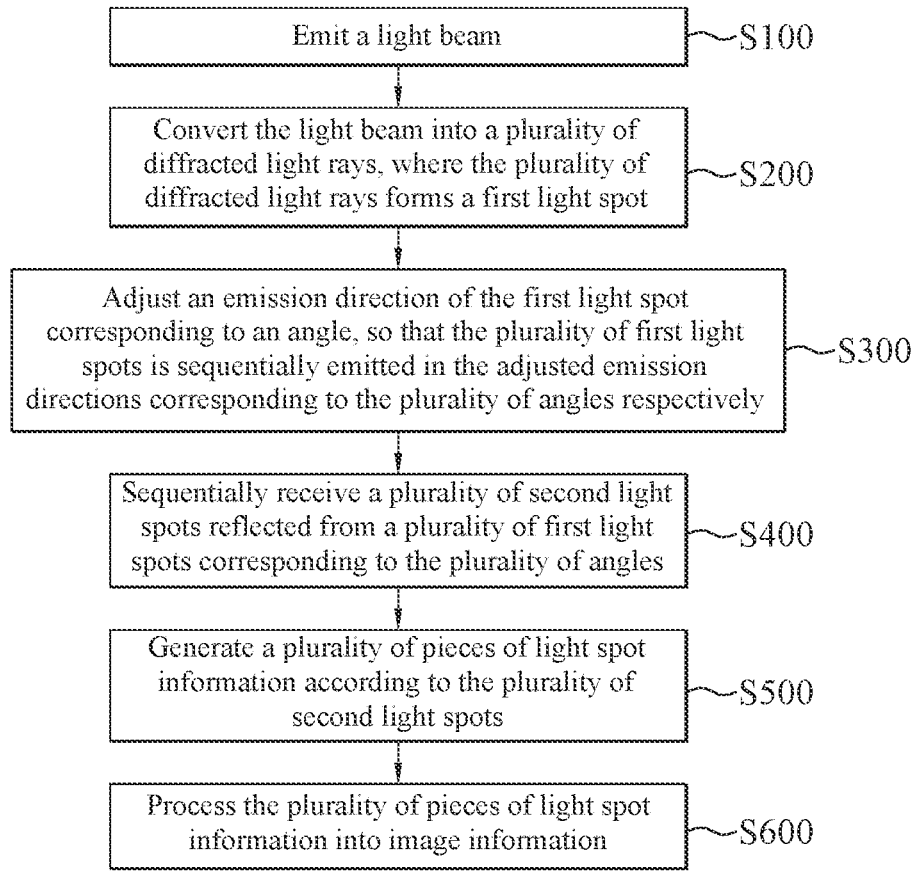
FIG. 9 is a flowchart of an imaging method according to some embodiments of the present invention.

Referring to FIG. 1 and FIG. 9, in some embodiments, the light emitter 100 emits a light beam (step S100). The light emitter 100 may be, but is not limited to, a laser emitter or a high-brightness light emitting diode (high-brightness LED). The light beam may be, but is not limited to, any laser light source or a light beam with a high-brightness LED combined with a reflector and an optical beam-concentrating element to form a laser-like light beam. In an example, the light beam is laser light emitted by a vertical-cavity surface-emitting laser (VCSEL).

Next, the optical diffraction plate 200 converts the light beam into a plurality of diffracted light rays (step S200). Herein, the plurality of diffracted light rays forms a first light spot, such as but not limited to a matrix-distributed light beam, and these light beams projected onto a plane correspondingly form a matrix-distributed light spot (or a luminescent spot). In some examples, the above optical diffraction plate 200 is a diffractive optical element (DOE).

Step S200 is continued. The first light spot passes through a pair of wedge prisms 300, and the pair of wedge prisms 300 are for adjusting an emission direction of the first light spot corresponding to an angle, so that the plurality of first light spots is sequentially emitted to an object 700 in the adjusted emission directions corresponding to the plurality of angles (step S300). For example, the pair of wedge prisms 300 includes a first wedge prism 300a and a second wedge prism 300b. The first wedge prism 300a and the second wedge prism 300b are arranged back and forth in a direction of the light channel 600. In other words, the first wedge prism 300a is relatively close to the optical diffraction plate 200, and the second wedge prism 300b is relatively far away from the optical diffraction plate 200. In addition, after the first light spot first passes through the first wedge prism 300a, then passes through the second wedge prism 300b, and then is emitted onto a surface of the object 700.

Moreover, the "angle" of the aforementioned "emission directions corresponding to the plurality of angles" is defined as an angle formed by a emission direction of the first light spot with respect to an axial direction of the light emitter 100 (that is, the emission angle). In the following, the above "angle" is equivalent to "the emission angle", but not the same as "a rotation angle" of the rotation unit.

The rotation unit 350 is connected to the pair of wedge prisms 300 and rotates the pair of wedge prisms 300 relative to each other. For example, the rotation unit 350 may simultaneously adjust rotation angled of the first wedge prism 300a and the second wedge prism 300b, or the rotation unit 350 may adjust a rotation angle of one of the first wedge prism 300a and the second wedge prism 300b, and fix a rotation angle of the other wedge prism (300a or 300b). Therefore, when relative positions of the first wedge prism 300a and the second wedge prism 300b are adjusted by means of the rotation unit 350, the emission directions of the light beams passing through the pair of wedge prisms 300 are also different.

As a result, the rotation unit 350 rotates the pair of wedge prisms 300 to adjust an emission direction of the first light spot corresponding to an angle, so that the plurality of first light spots is sequentially emitted to the object 700 in the adjusted emission directions corresponding to the plurality of angles (step S300). In addition, the light receiver 400 sequentially receives a plurality of second light spots reflected from the plurality of first light spots corresponding to the plurality of angles (step S400). The processing unit 500 generates a plurality of pieces of light spot information 15 according to the plurality of second light spots (step S500) and processes the plurality of pieces of light spot information 15 into image information 20 (step S600). The pieces of light spot information 15 includes a plurality of pieces of reflected light information 10 (referring to FIG. 6A to FIG. 6E and FIG. 7A to FIG. 7E). For example, the first light spot formed by the plurality of diffracted light rays is emitted to the surface of the object 700 in an emission direction corresponding to an angle, and the plurality of diffracted light rays form a plurality of reflection points 710 on the surface of the object 700 and are reflected as a plurality of reflected light rays (referring to FIG. 2A to FIG. 5B). In addition, the plurality of reflected light rays form a second light spot, and the second light spot is sensed by the light receiver 400 and then converted into a sensing signal to be emitted to the processing unit 500. The processing unit 500 then generates a piece of light spot information 15 according to the sensing signal. By analogy, another first spot emitted in another emission direction corresponding to another angle is eventually reflected from the object 700 to form another second spot, and the another second spot is eventually sensed by the light receiver 400 and processed into another piece of light spot information 15 by the processing unit 500. The processing unit 500 integrates the piece of light spot information 15 corresponding to one angle and another piece of light spot information 15 corresponding to another angle to form the image information 20.

In some examples, the processing unit 500 is an element such as a central processing unit (CPU), a microprocessor, or the like.

In some embodiments, the imaging device 1 further includes a collimator 150. In addition, the collimator 150 is between the light emitter 100 and the optical diffraction plate 200, as shown in FIG. 2A, FIG. 3A, FIG. 4A, and FIG. 5A. In some embodiments, the collimator 150 is for collimating the light beam. In addition, the light emitter 100 and the optical diffraction plate 200 are both disposed corresponding to the collimator 150.

In some embodiments, a number of the rotation units 350 may be, but not limited to 1, 2, or more. In some embodiments, one rotation unit 350 is provided to be connected to one of the wedge prisms 300 (that is, the first wedge prism 300a or the second wedge prism 300b), and the other wedge prism 300 (that is, the second wedge prism 300b or the first wedge prism 300a) is immobile. Therefore, one of the wedge prisms 300 rotates relative to the other wedge prism 300 when being rotated by the rotation unit 350. In some embodiments, two rotation units 350 are provided to be respectively connected to the first wedge prism 300a and the second wedge prism 300b. Therefore, the first wedge prism 300a and the second wedge prism 300b may rotate relative to each other at the same time, or one of the rotation unit 350 does not rotate, and the other rotation unit 350 rotates relative to the irrotational rotation unit. In this way, the rotation unit 350 rotates the pair of wedge prisms 300 relative to each other to adjust the emission angle of the first light spot passing through the pair of wedge prisms 300, and causes the plurality of first light spots to be sequentially emitted in the emission directions corresponding to the plurality of angles respectively by changing a plurality of emission angles generated by the relative rotation of the pair of wedge prisms 300. Herein, the aforementioned "adjust the emission angle of the first light" means "adjust the emission direction of the first light spot corresponding to an angle".

Figure 2A:
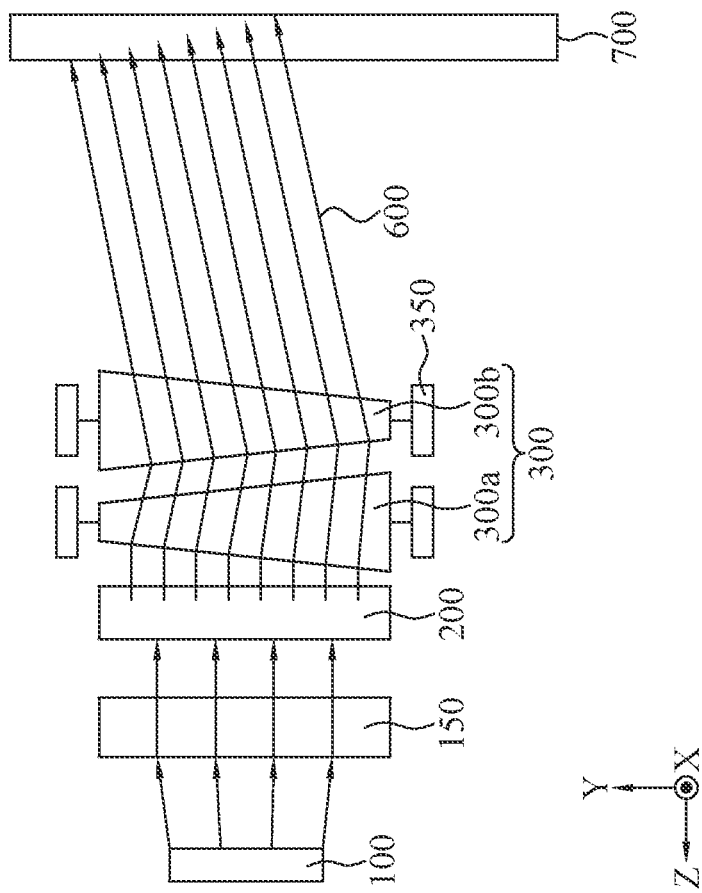
FIG. 2A is a schematic diagram of a usage status of the imaging device at a first time point according to some embodiments of the present invention.
Figure 2B:
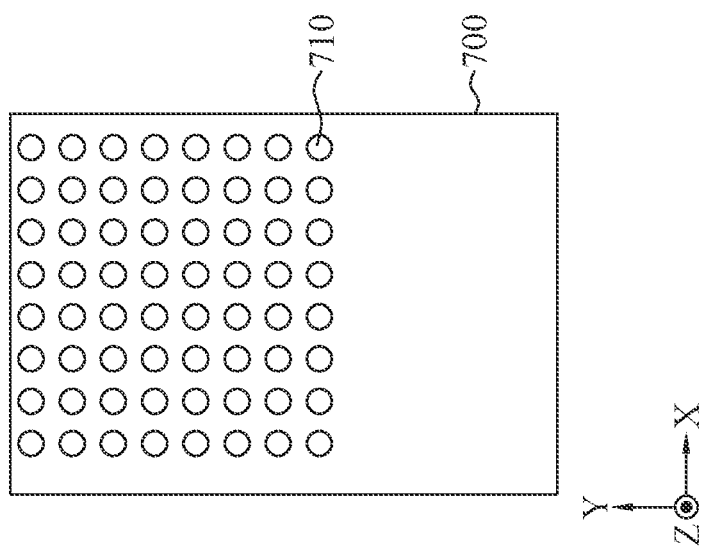
FIG. 2B is a schematic diagram of a plurality of reflection points in FIG. 2A.
Figure 3A:
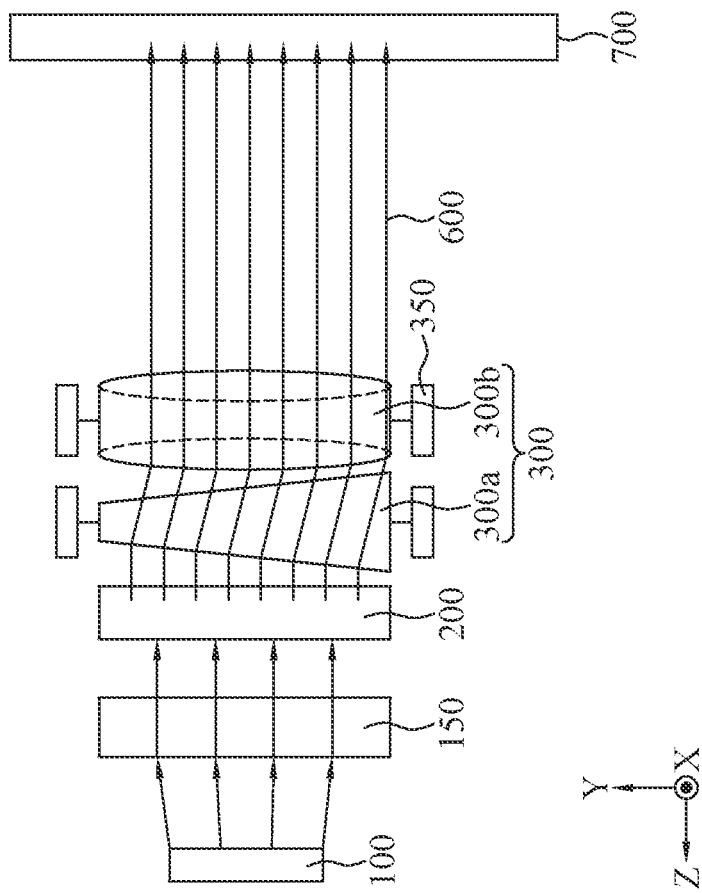
FIG. 3A is a schematic diagram of a usage status of the imaging device at a second time point.
Figure 3B:
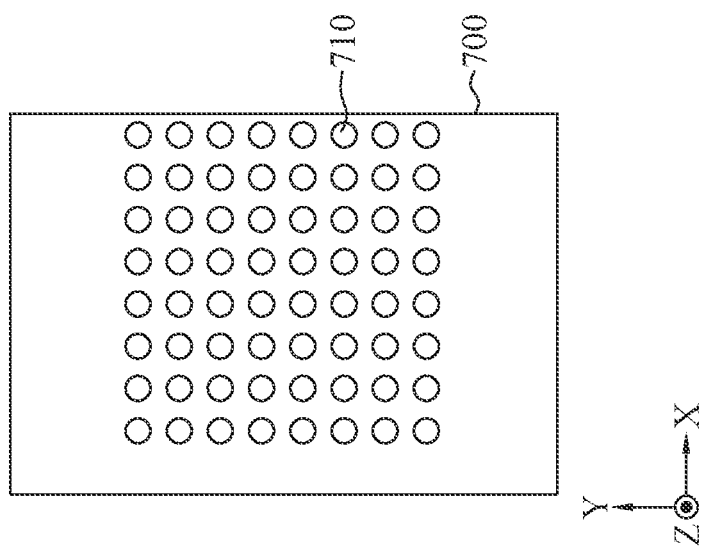
FIG. 3B is a schematic diagram of a plurality of reflection points in FIG. 3A.
Figure 4A:
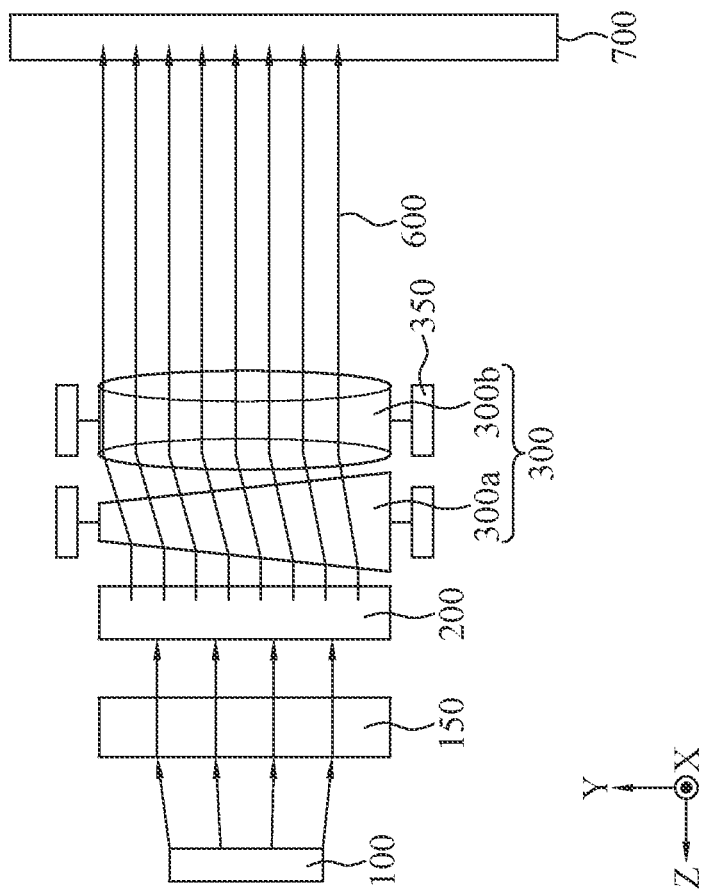
FIG. 4A is a schematic diagram of a usage status of the imaging device at a third time point.
Figure 4B:
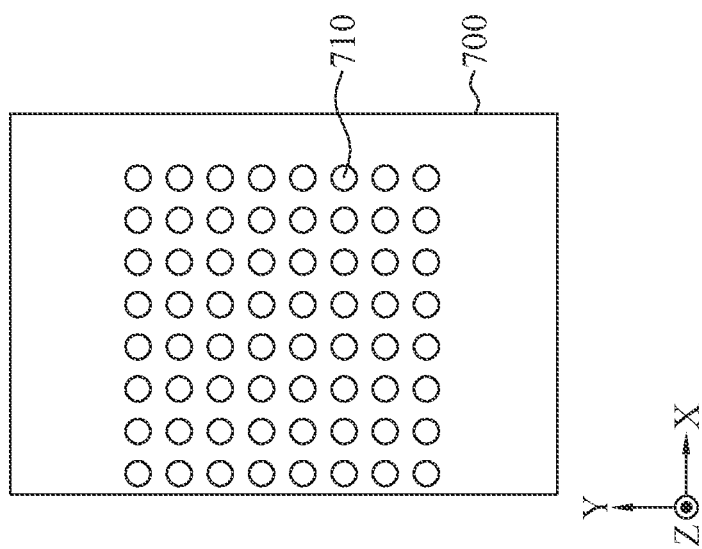
FIG. 4B is a schematic diagram of a plurality of reflection points in FIG. 4A.
Figure 5A:
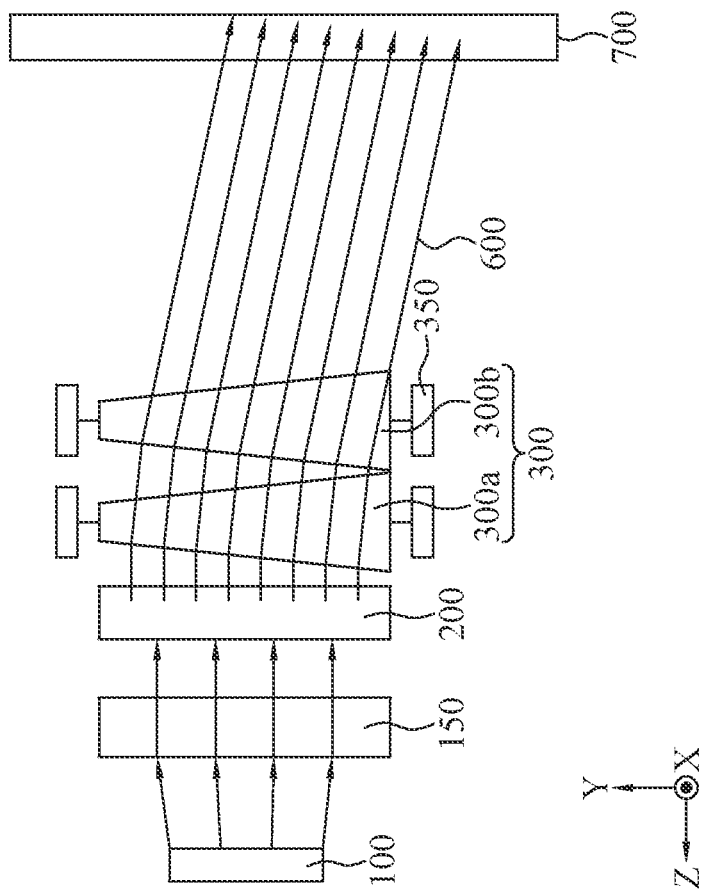
FIG. 5A is a schematic diagram of a usage status of the imaging device at a fourth time point.
Figure 5B:
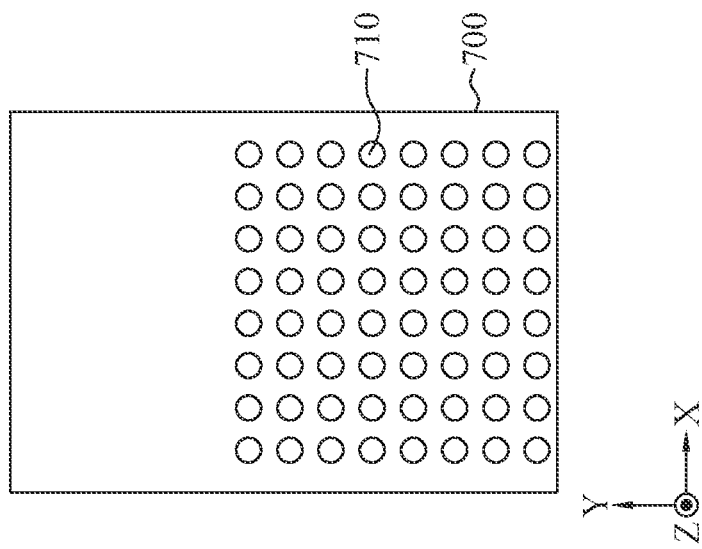
FIG. 5B is a schematic diagram of a plurality of reflection points in FIG. 5A.

Referring to FIG. 2A, FIG. 3A, FIG. 4A, and FIG. 5A, in some embodiments, four paths are generated through four different emission angles of the first light spots that are adjusted by using the pair of wedge prisms 300. In other words, the emission angle of the first light spot is changed through the pair of wedge prisms 300, and positions at which the first light spot is projected onto the surface of the object are also different. Referring to FIG. 2A, in some embodiments, at the first time point, the light emitter 100 emits a light beam, and the light beam passes through the collimator 150 and then enters the optical diffraction plate 200 to form a plurality of diffracted light rays, wherein the plurality of diffracted light rays forms a first light spot. The first light spot is refracted according to a refractive index of the first wedge prism 300a to pass through the first wedge prism 300a, and then enters the second wedge prism 300b. The first light spot is refracted by the second wedge prism 300b and passes through the second wedge prism 300b. Then, the first light spot is projected onto a left side of the surface of the object 700 to form a plurality of reflection points 710 (as shown in FIG. 2B, the left side is upward along an axis Y). Moreover, at different time points, the relative rotation angles and rotation positions of the pair of wedge prisms 300 are different, and the first light spot is emitted in the different emission direction corresponding to the different emission angle, thereby changing the position at which the first light spot is projected onto the surface of the object (that is, a position of the reflection points 710). FIG. 3A to FIG. 5A sequentially show the remaining three paths of the light beam and the first light spot from the second time point to the fourth time point. In some embodiments, FIG. 3B illustrates that the first light spot formed at the second time point is projected onto an upper side of the surface of the object 700 to form a plurality of reflection points 710 (as shown in FIG. 3B, the upper side is in the middle of the axis Y and to the right along the axis X), FIG. 4B illustrates that the first light spot formed at the third time point is projected onto a lower side of the surface of the object 700 to form a plurality of reflection points 710 (as shown in FIG. 4B, the lower side is in the middle of the axis Y and to the left along the axis X), and FIG. 5B illustrates that the first light spot formed at the fourth time point is projected onto a right side of the surface of the object 700 to form a plurality of reflection points 710 (as shown in FIG. 5B, the right side is downward along the axis Y). It should be particularly noted that the positions at which the first light spots are projected in the above figures are merely for the convenience of description and simplified description of the content of the invention, and does not indicate or imply that the referred element or state needs to have a specific number of time points, a specific orientation, and a specific size. Therefore, it cannot be understood as a limitation on the present invention.

In some embodiments, the plurality of first light spots is sequentially emitted in the adjusted emission directions corresponding to the plurality of angles respectively as described above, wherein any of the plurality of angles is at an acute angle to an axis direction of the light emitter. In other words, any emission direction of the first light spot is at an acute angle to the axis direction of the light emitter. In some embodiments, one of the plurality of angles is parallel to the axis direction of the light emitter. In other words, one emission direction of the first light spot is parallel to the axis direction of the light emitter.

In addition, in some embodiments, the first light spot is projected onto the surface of the object 700 at one of the plurality of angles to form a plurality of reflection points 710 (as shown in FIG. 2B, FIG. 3B, FIG. 4B, or FIG. 5B), and a plurality of reflected light rays reflected from the plurality of reflection points 710 form a corresponding one of the plurality of second light spots. Herein, the aforementioned "at one of the plurality of angles" means "in the emission direction corresponding to one of the plurality of angle".

In some embodiments, when light projection power of the light emitter 100 is relatively low (for example, requirements for energy saving or low power consumption, and the like), it is necessary to concentrate the light beam to be projected farther. Moreover, when the light beam is more concentrated, an irradiation range of the reflection point 710 formed by the first light spot projected onto the object 700 or a sensing range of the second light spot sensed by the light receiver 400 (corresponding to the irradiation range of the reflection point 710 formed by the first light spot on the object 700) is smaller. In this case, if the object or surface that needs to sense depth information is larger, the projection range of the first light spot needs to be increased (corresponding to the sensing range of the second light spot sensed by the light receiver 400). Alternatively, in a case that a distance between a to-be-imaged object 7000 and the imaging device 1 is closer or in an environment that is a narrow space, it may also be necessary to increase the projection range of the first light spot (corresponding to the sensing range of the second light spot sensed by the light receiver 400). Regardless of the above reasons or any other use conditions that require a larger sensing range, the projection angle of the first light spot at different time points can be changed by means of the wedge prism 300, so that the first light spots continuously projected onto the object 700 at different time points do not overlap each other, and ranges of the plurality of second light spots that are reflected do not overlap each other. In other words, the second light spots reflected from the plurality of angles in such a usage status form, in the processing unit 500, image information 20 composed of a plurality of pieces of light spot information 15 that is adjacent to and does not overlap each other, and the plurality of pieces of light spot information 15 is composed of a plurality of pieces of reflected light information 10. In other words, in an example, the image information 20 may be composed of a plurality of pieces of light spot information 15 that is adjacent to and does not overlap each other, thereby expanding the total projection range of the first light spot (corresponding to a total sensing range of the second light spot sensed by the light receiver 400), as shown in FIG. 6E.

Figure 6A:
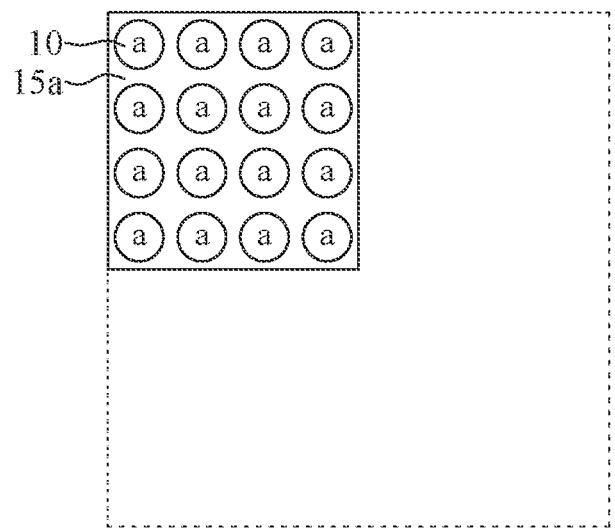
FIG. 6A is a schematic diagram of a first set of light spot information composed of reflected light information a at the first time point according to some embodiments of the present invention.
Figure 6B:
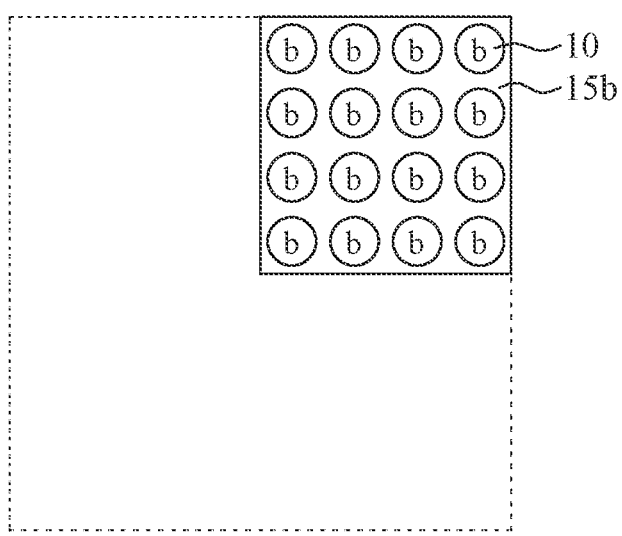
FIG. 6B is a schematic diagram of a second set of light spot information composed of reflected light information b at the second time point according to some embodiments of the present invention.
Figure 6C:
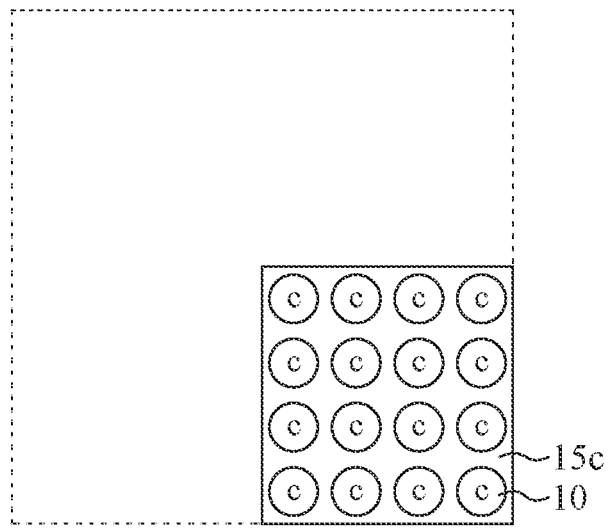
FIG. 6C is a schematic diagram of a third set of light spot information composed of reflected light information c at the third time point according to some embodiments of the present invention.
Figure 6D:
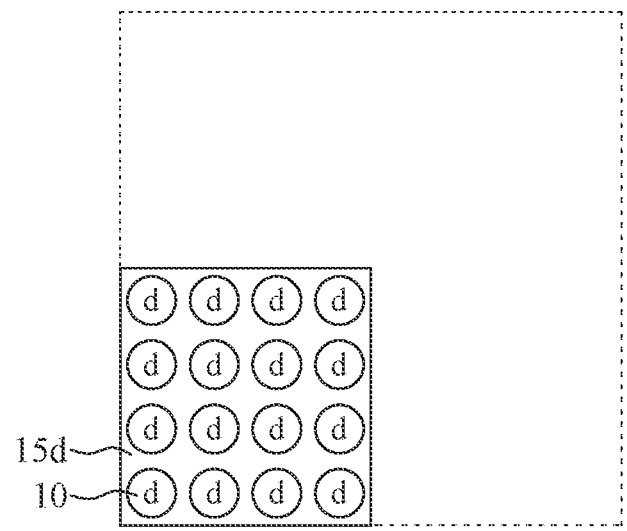
FIG. 6D is a schematic diagram of a fourth set of light spot information composed of reflected light information d at the fourth time point according to some embodiments of the present invention.
Figure 6E:
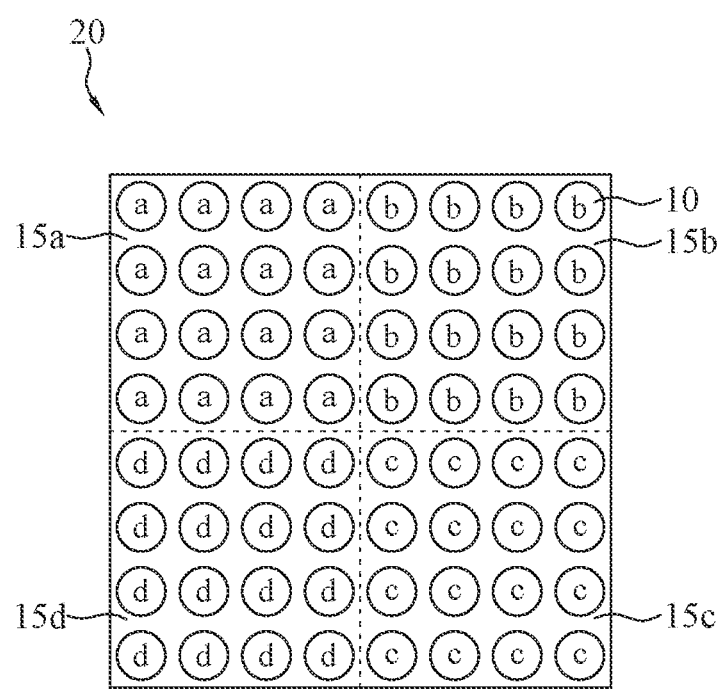
FIG. 6E shows image information composed of a plurality of pieces of light spot information that is adjacent to and does not overlap each other according to some embodiments of the present invention.

In some embodiments, FIG. 6A to FIG. 6E are given by way of example. The first set of light spot information 15a received and generated by the processing unit 500 at the first time point is composed of a plurality of pieces of reflected light information a (as shown in FIG. 6A). In a similar manner, the corresponding second set of light spot information 15b received and generated by the processing unit 500 at the second time point is composed of a plurality of pieces of reflected light information b (as shown in FIG. 6B), the corresponding third set of light spot information 15c received and generated at the third time point is composed of a plurality of pieces of reflected light information c (as shown in FIG. 6C), and the corresponding fourth set of light spot information 15d received and generated at the fourth time point is composed of a plurality of pieces of reflected light information d (as shown in FIG. 6D). The dotted lines in FIG. 6A to FIG. 6D represent reference positions to present changes in the light spot information 15 relative to the reference position in FIG. 6A to FIG. 6D. Since the rotation angle of the pair of wedge prisms 300 is relatively large, the sets of light spot information 15 are distributed densely but do not overlap each other. Then, the processing unit 500 processes the four sets of light spot information 15 into one piece of image information 20 (as shown in FIG. 6E). In other words, the image information 20 is composed of a first set of light spot information 15a, a second set of light spot information 15b, a third set of light spot information 15c, and a fourth set of light spot information 15d. The image information 20 is the light spot information 15 in a quadruple range, but is not limited thereto. For example, the first set of light spot information 15a, the second set of light spot information 15b, the third set of light spot information 15c, and the fourth set of light spot information 15d are each a 4×4 light spot (reflected light information 10) distribution matrix, and the combined image information 20 is an 8×8 light spot distribution matrix. In this way, the originally small irradiation range and/or sensing range may be expanded into a larger irradiation range and/or sensing range. In a case that the distance between the light spots remains unchanged, the four 4×4 light spot distribution matrices are arranged into an 8×8 light spot distribution matrix, which indicates that a length and a width of the irradiation range and/or sensing range are respectively doubled, and total areas increase by four times. In some embodiments, the rotation angle of the pair of wedge prisms 300 may cause the plurality of reflection points 710 to be displaced up and down by 63 micrometers (μm) from an initial irradiation center of the surface of the object 700, and a square area with a length and a width of both 126 microns (126 μm×126 μm) after four time points is irradiated. In other words, the irradiation positions of the four set of plurality of reflection points 710 constitute a range of the reflection point 710 with a length and a width of 126 microns (126 μm×126 μm).

In another embodiment, when the light beam is projected farther, the light emitter 100 may cause a loose distribution of the first light spot or the reflection points 710 of the first light spot projected onto the object 700. Alternatively, when the object 700 to be imaged or the environment is more complicated, if the distribution of the reflection points 710 formed by the first light spot (corresponding to sensing precision of the second light spot by the light receiver 400) is not fine enough, accurate depth information of the object 700 or the environment cannot be obtained. In this case, a denser distribution of reflection points 710 is required in such a way that the light receiver 400 can receive more second light spots within the same range to obtain more precise distance (such as a time of flight) information. In other words, higher resolution can be obtained. Therefore, in any case where a higher resolution is required, the projection angle of the first light spot at different time points can be changed by using the pair of wedge prisms 300, the change in the projection angle at different time points is smaller compared to the above embodiments of FIG. 6A to FIG. 6E, so that the ranges of the first light spot continuously projected onto the object 700 at different time points overlap, and the ranges of the plurality of second light spots that are reflected back also overlap each other (but the plurality of reflection points 710 in the overlapping range of the plurality of first light spots do not overlap each other, and a plurality of pieces of reflected light rays in the overlapping range of the plurality of second light spots do not overlap each other), which can be added up to form a more dense distribution of the light spot information 15, thereby improving image resolution or fineness of depth information. In other words, the second light spots reflected from the plurality of angles in such a usage status form, in the processing unit 500, image information 20 composed of a plurality of pieces of light spot information 15 that are adjacent to and overlap each other, and the plurality of pieces of reflected light information 10 of the plurality of pieces of light spot information 15 in the image information 20 do not overlap each other. In other words, in another example, the image information 20 is composed of a plurality of pieces of light spot information 15 that are adjacent to and overlap each other, and the plurality of pieces of reflected light information 10 of the plurality of pieces of light spot information 15 do not overlap each other, thereby increasing the density of the first light spot in the same irradiation range (corresponding to the density of the second light spot sensed by the light receiver 400 in the same sensing range), as shown in FIG. 7E.

Figure 7A:
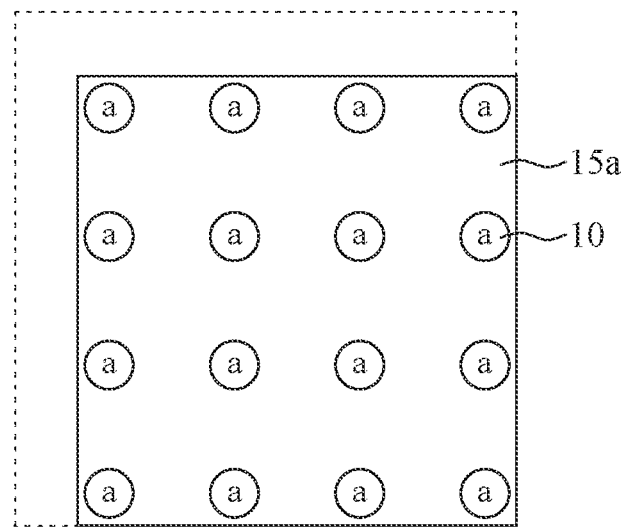
FIG. 7A is a schematic diagram of the first set of light spot information composed of the reflected light information a at the first time point according to some other embodiments of the present invention.
Figure 7B:
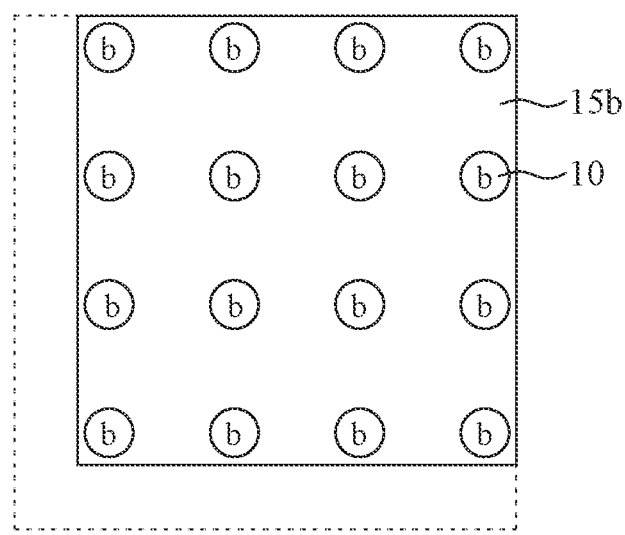
FIG. 7B is a schematic diagram of the second set of light spot information composed of the reflected light information b at the second time point according to some other embodiments of the present invention.
Figure 7C:
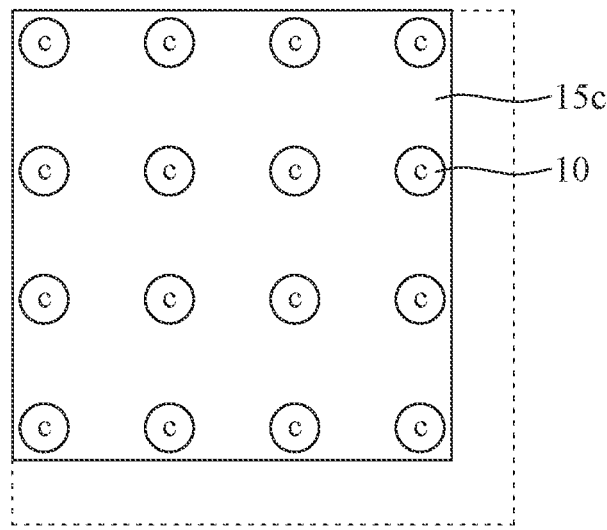
FIG. 7C is a schematic diagram of the third set of light spot information composed of the reflected light information c at the third time point according to some other embodiments of the present invention.
Figure 7D:
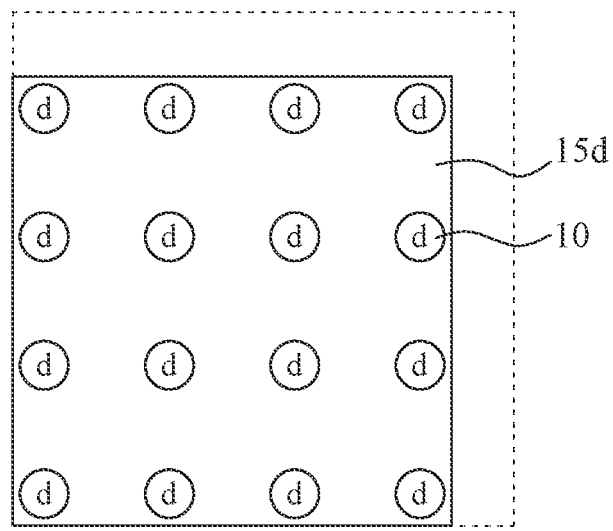
FIG. 7D is a schematic diagram of the fourth set of light spot information composed of the reflected light information d at the fourth time point according to some other embodiments of the present invention.
Figure 7E:
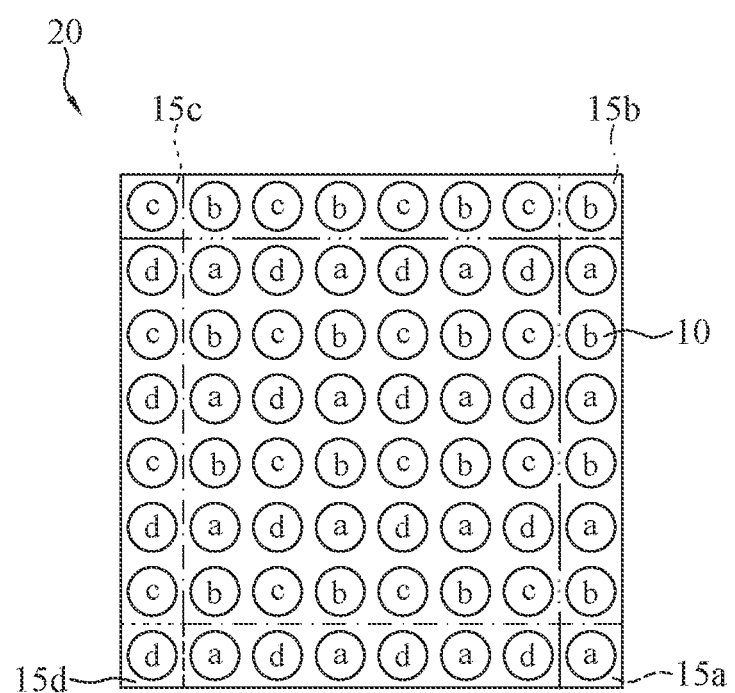
FIG. 7E shows image information composed of a plurality of pieces of light spot information that is adjacent to and overlap each other according to some other embodiments of the present invention.

In some embodiments, FIG. 7A to FIG. 7E are given by way of example. The first set of light spot information 15a received and generated by the processing unit 500 at the first time point is composed of a plurality of pieces of reflected light information a (as shown in FIG. 7A). In a similar manner, the corresponding second set of light spot information 15b received and generated by the processing unit 500 at the second time point is composed of a plurality of pieces of reflected light information b (as shown in FIG. 7B), the corresponding third set of light spot information 15c received and generated at the third time point is composed of a plurality of pieces of reflected light information c (as shown in FIG. 7C), and the corresponding fourth set of light spot information 15d received and generated at the fourth time point is composed of a plurality of pieces of reflected light information d (as shown in FIG. 7D). The dotted lines in FIG. 7A to FIG. 7D represent reference positions to present changes in the light spot information 15 relative to the reference position in FIG. 7A to FIG. 7D. Since the rotation angle of the pair of wedge prisms 300 is relatively small, the sets of light spot information 15 (that is, the first set of light spot information 15a, the second set of light spot information 15b, the third set of light spot information 15c, and the fourth set of light spot information 15d) are distributed densely and overlap each other, but the pieces of reflected light information (a, b, c, or d) do not overlap each other. Then, the processing unit 500 processes the four sets of light spot information 15 into one piece of image information 20 (as shown in FIG. 7E). In other words, the image information 20 is composed of a first set of light spot information 15a, a second set of light spot information 15b, a third set of light spot information 15c, and a fourth set of light spot information 15d. The image information 20 is the light spot information 15 with quadruple distribution density, but is not limited thereto. For example, the first set of light spot information 15a, the second set of light spot information 15b, the third set of light spot information 15c, and the fourth set of light spot information 15d are each a 4×4 light spot (reflected light information 10) distribution matrix, and the combined image information 20 is an 8×8 light spot distribution matrix. In this way, the originally sparse spot distribution may be changed to a denser spot distribution. In a case that the irradiation range and/or the sensing range is almost unchanged or only slightly increased, the four 4×4 light spot distribution matrices are arranged together to form an 8×8 light spot distribution matrix, which indicates that the distribution density at the length and the width of the light spots is increased by two times, the total density is increased by four times, and total resolution of the second light spot sensed by the light receiver 400 is also increased by four times. In some embodiments, the rotation angle of the pair of wedge prisms 300 can make the plurality of reflection points 710 move up, down, left, and right from the initial irradiation center of the surface of the object 700 with an accuracy of 2 micrometers (µm).

In some embodiments, the processing unit 500 calculates a TOF according to the pieces of light spot information 15 to generate the corresponding image information 20. The TOF technology is divided into a direct TOF (Direct-TOF) and an indirect TOF (I-TOF).

A calculation principle of the direct TOF is triggered by emitting the first light spot by the light emitter 100 and receiving the reflected second light spot by the light receiver 400. When the light receiver 400 receives the second light spot, the processing unit 500 may calculate an actual distance between the imaging device 1 and the object 700 by using a relationship between a speed of light, a time interval between emitting of the first light spot and receiving of the second light spot, and a frequency at which the light beam is emitted. Calculation of the TOF by using the direct TOF has the advantages of a long detection distance, a fast calculation speed, low power consumption (emission of the light beam), good resistance to light interference, and the like.

A calculation principle of the indirect TOF is triggered by receiving the reflected second light spot for the second time by the light receiver 400. When the light receiver 400 receives the second light spot for the first time and then receives the second light spot for the second time, the processing unit 500 receives a phase of the second light spot for a second time, and calculates the distance through the phase. Calculation of the TOF by using the indirect TOF has the advantages of a long detection distance, high resolution, low power consumption (emission of the light beam), good resistance to light interference, and the like.

In some examples, the light emitter 100 emits a light beam (step S100). The light beam passes through the optical diffraction plate 200 and is converted into a plurality of diffracted light rays, and the plurality of diffracted light rays form a first light spot (step S200). The first light spot passes through the pair of wedge prisms 300. The pair of wedge prisms 300 are used to adjust an emission direction of the first light spot corresponding to an angle, so that the plurality of first light spots is sequentially emitted in the adjusted emission direction corresponding to the plurality of angles respectively (step S300). The first light spot is projected onto the object 700 to form a plurality of reflection points 710, and a plurality of reflected light rays reflected from the plurality of reflection points 710 form a corresponding one of the plurality of second light spots. Then, the light receiver 400 sequentially receives a plurality of second light spots reflected from the plurality of first light spots corresponding to the plurality of angles (step S400), and emits the plurality of second light spots to the processing unit 500. The processing unit 500 generates a plurality of pieces of light spot information 15 according to the plurality of second light spots (step S500) and then processes the plurality of pieces of light spot information 15 into image information 20 (step S600).

Figure 10:
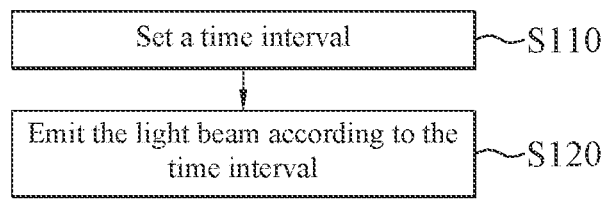
FIG. 10 is a flowchart of step S100 in FIG. 9.

Referring to FIG. 10, in some embodiments, the processing unit 500 is further for set a time interval (step S110). In some embodiments, the imaging device 1 further includes a driving circuit 550, and the driving circuit 550 is electrically connected to the processing unit 500, as shown in FIG. 1. In this way, in an embodiment, after the time interval is set, the driving circuit 550 drives the light emitter 100 to emit the light beam according to the time interval (step S120), and the processing unit 500 calculates a TOF according to the time interval and the pieces of light spot information 15 to generate corresponding image information 20.

In some other examples, the processing unit 500 first sets a time interval (step S110). Then the light emitter 100 emits a light beam according to the time interval (step S120). The light beam passes through the optical diffraction plate 200 and is converted into a plurality of diffracted light rays, and the plurality of diffracted light rays form a first light spot (step S200). The first light spot passes through the pair of wedge prisms 300. The pair of wedge prisms 300 are used to adjust an emission direction of the first light spot corresponding to an angle, so that the plurality of first light spots is sequentially emitted in the adjusted emission direction corresponding to the plurality of angles respectively (step S300). The first light spot is projected onto the object 700 to form a plurality of reflection points, and a plurality of reflected light rays reflected from the plurality of reflection points form a corresponding one of the plurality of second light spots. Then, the light receiver 400 sequentially receives a plurality of second light spots reflected from the plurality of first light spots corresponding to the plurality of angles (step S400), and emits the plurality of second light spots to the processing unit 500. The processing unit 500 generates a plurality of pieces of light spot information 15 according to the plurality of second light spots (step S500) and then processes the plurality of pieces of light spot information 15 into image information 20 (step S600). For example, the corresponding image information 20 is generated by calculating the TOF according to the time interval and the pieces of light spot information 15.

Figure 8A:
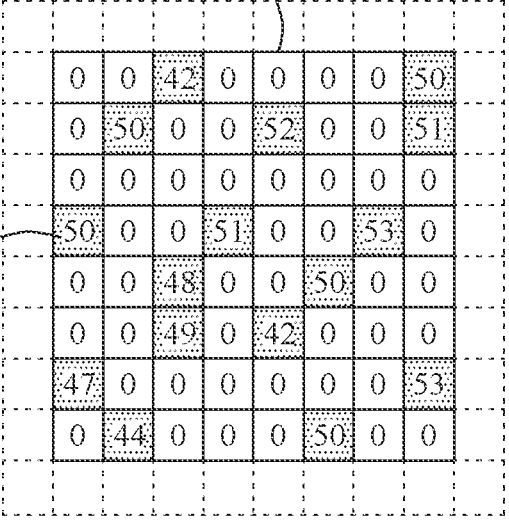
FIG. 8A shows a piece of light spot information according to some embodiments of the present invention.
Figure 8B:
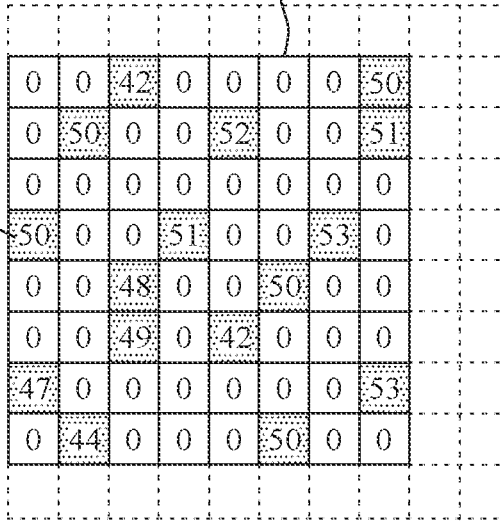
FIG. 8B shows another piece of light spot information according to some embodiments of the present invention.
Figure 8C:
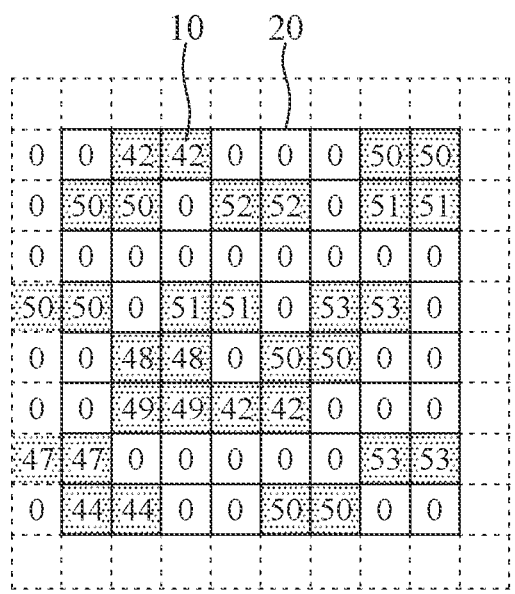
FIG. 8C shows two pieces of light spot information that are adjacent to and overlap each other according to some embodiments of the present invention.

Referring to FIG. 8A to FIG. 8C, in an example, the light emitter 100 emits a first set of light beams at a first time point. The first set of light beams pass through the optical diffraction plate 200 and are converted into a first set of first light spots formed by a plurality of diffracted light rays. The first set of first light spots pass through a pair of wedge prisms 300 and are projected onto a surface of an object at an adjusted first emission angle. The first set of first light spots form a first set of reflection points 710 on the surface of the object, and a first set of a plurality of reflected light rays are reflected from the first set of reflection points 710 and form a first set of second light spots. The first set of second light spots form the first set of light spot information 15 through the processing unit 500, as shown in FIG. 8A. Referring to FIG. 8A again, solid grid areas represent the first set of light spot information 15, and the grids each represent reflected light information 10. Numbers 42, 44, 47, 48, 49, 50, 51, and 53 in the grids represent detected distance information (or a distance value of the TOF obtained through calculation), and a unit of the distance information or the distance value is millimeter or centimeter. The number 0 represents reflected light information 10 that is not detected. In some embodiments, since the light beam is converted into a plurality of diffracted light rays after passing through the optical diffraction plate 200, under certain conditions (such as an influence of the reflection angle, roughness of the reflection surface, and the like), the reflected light reflected from some reflection points 710 projected onto the surface of the object does not have sufficient light intensity, and therefore cannot be successfully detected. The reflected light information corresponding to such a reflective point 710 is represented by 0.

Then, in order to obtain more precise distance (for example, TOF) information, the light emitter 100 emits a second set of light beams at a second time point. The second set of light beams pass through the optical diffraction plate 200 and are converted into a second set of first light spots formed by a plurality of diffracted light rays. The second set of first light spots pass through the pair of wedge prisms 300 and are projected onto the surface of the object at an adjusted second emission angle. Since the second emission angle is relatively small, the irradiation position of the second set of first light spots and the irradiation position of the first set of first light spots overlap. In other words, the position of the second set of reflection points 710 and the position of the first set of reflection points 710 overlap. Therefore, the second set of light spot information 15 (shown in FIG. 8B) is slightly shifted relative to the first set of light spot information 15 (shown in FIG. 8A) (for example, the light spot information 15 in FIG. 8B is shifted to the left by one grid compared to that in FIG. 8A). Referring to FIG. 8B, solid grid areas represent the second set of light spot information 15, and the grids each represent reflected light information 10. Numbers 42, 44, 47, 48, 49, 50, 51, and 53 in the grids represent detected distance information (or a distance value of the TOF obtained through calculation), and a unit of the distance information or the distance value is millimeter or centimeter. The number 0 represents reflected light information 10 that is not detected.

The processing unit 500 then processes the first set of light spot information 15 and the second set of light spot information 15 into one piece of image information 20, as shown in FIG. 8C. The first set of light spot information 15 and the second set of light spot information 15 overlap each other, but the pieces of reflected light information 10 do not overlap each other. Referring to FIG. 8C, compared to FIG. 8A and FIG. 8B, FIG. 8C shows that more and more detailed pieces of reflected light information 10 are obtained through processing. Therefore, the obtained image information 20 has higher resolution.

In addition, in some embodiments, the rotation angle of the pair of wedge prisms 300 is adjusted according to requirements, and the optical diffraction plate 200 is used to obtain more reflected light information, which helps the imaging device 1 collect different light spot information 15 within a period of time and process the light spot information into the image information 20 with higher resolution, or collect different light spot information 15 and process the light spot information into image information 20 with a larger range. Therefore, in some embodiments, the imaging method or the imaging device 1 may be applied to an optical image stabilization (OIS) technology.

In some embodiments, the imaging device 1 may be converted from serving as a point light source (that is, a light beam) into a surface light source (that is, a first light spot) through the optical diffraction plate 200, and increases light rays projected onto the object. In some embodiments, the first light spots emitted in the different emission directions corresponding to the plurality of different angles respectively through the pair of wedge prisms 300 can achieve a wider or denser irradiation range by rotating the pair of wedge prisms 300. In some embodiments, the light receiver 400 does not need to be spatially displaced to receive the second light spot reflected from the object. Therefore, the imaging device 1 with a smaller volume can be formed, and the manufacturing costs can be reduced.

Based on the above, according to the imaging device 1 and the imaging method of some embodiments provided in the present invention, the projection direction of the first light spots can be changed by rotating a pair of wedge prisms 300, so as to achieve a wider irradiation range or a finer light spot distribution, thereby improving a photographing range (that is, improving a limitation on an angle of view) or photographing resolution. In this way, the present invention can be applicable to various situations according to requirements (for example, when a larger sensing range is required, or when more precise distance information is required) to correspondingly obtain image information 20 with a wider range or image information 20 with higher resolution. In addition, the present invention can provide an imaging device 1 with a smaller volume and reduce the manufacturing costs of the imaging device 1.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An imaging device, comprising:
    a light emitter for emitting a light beam;
    an optical diffraction plate on a light channel of the light emitter and for converting the light beam into a plurality of diffracted light rays, wherein the plurality of diffracted light rays forms a first light spot;
    a pair of wedge prisms on the light channel and for adjusting an emission direction of the first light spot corresponding to an angle;
    a rotation unit connected to the pair of wedge prisms and for rotating the pair of wedge prisms relative to each other, so that the plurality of first light spots is sequentially emitted in the adjusted emission directions corresponding to the plurality of angles respectively, wherein the first light spot is projected onto a surface of an object at one of the plurality of angles to form a plurality of reflection points, a plurality of reflected light rays reflected from the plurality of reflection points forms a corresponding one of a plurality of second light spots;
    a light receiver for sequentially receiving the plurality of second light spots reflected from the plurality of first light spots corresponding to the plurality of angles; and
    a processing unit connected to the light receiver and for generating a plurality of pieces of light spot information that is adjacent to and does not overlap each other according to the plurality of second light spots and processing the plurality of pieces of light spot information into image information, wherein the pieces of light spot information comprise a plurality of pieces of reflected light information.

2. The imaging device according to claim 1, wherein the processing unit is for calculating a time of flight (TOF) according to the pieces of light spot information to generate the corresponding image information.

3. The imaging device according to claim 1, further comprising a collimator between the light emitter and the optical diffraction plate.

4. The imaging device according to claim 1, wherein the processing unit is further for setting a time interval, the imaging device further comprises a driving circuit electrically connected to the processing unit, the driving circuit is for driving the light emitter to emit the light beam according to the time interval, and the processing unit is for calculating a time of flight (TOF) according to the time interval and the pieces of light spot information to generate the corresponding image information.

5. An imaging method, comprising:
    emitting a light beam;
    converting the light beam into a plurality of diffracted light rays, wherein the plurality of diffracted light rays form a first light spot;
    adjusting an emission direction of the first light spot corresponding to an angle, so that the plurality of first light spots is sequentially emitted in the adjusted emission directions corresponding to the plurality of angles respectively;
    sequentially receiving a plurality of second light spots reflected from the plurality of first light spots corresponding to the plurality of angles;
    generating a plurality of pieces of light spot information according to the plurality of second light spots, wherein the pieces of light spot information are composed of a plurality of pieces of reflected light information; and
    processing the plurality of pieces of light spot information into image information, wherein the image information is composed of the plurality of pieces of light spot information that is adjacent to and does not overlap each other.

6. The imaging method according to claim 5, wherein the step of emitting the light beam comprises:
    setting a time interval; and
    emitting the light beam according to the time interval.

7. The imaging method according to claim 6, wherein the step of processing the plurality of pieces of light spot information into the image information comprises: calculating a time of flight (TOF) according to the time interval and the pieces of light spot information to generate the corresponding image information.

* * * * *